US012332674B2

(12) United States Patent
Upadhyaya et al.

(10) Patent No.: US 12,332,674 B2
(45) Date of Patent: Jun. 17, 2025

(54) LOW-DROPOUT VOLTAGE REGULATOR WITH SPLIT-BUFFER STAGE

(71) Applicant: Texas Instruments Incorporated, Dallas, TX (US)

(72) Inventors: Varun Upadhyaya, New Delhi (IN); Venkateswarlu Ramaswamy Tiruvamattur, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 104 days.

(21) Appl. No.: 18/051,072

(22) Filed: Oct. 31, 2022

(65) Prior Publication Data

US 2023/0367344 A1 Nov. 16, 2023

(30) Foreign Application Priority Data

May 10, 2022 (IN) ............................ 202241026846

(51) Int. Cl.
*G05F 1/575* (2006.01)
*G05F 1/565* (2006.01)
*G05F 1/59* (2006.01)

(52) U.S. Cl.
CPC .............. *G05F 1/575* (2013.01); *G05F 1/565* (2013.01); *G05F 1/59* (2013.01)

(58) Field of Classification Search
CPC ............. G05F 1/565; G05F 1/575; G05F 1/59
See application file for complete search history.

(56) References Cited

U.S. PATENT DOCUMENTS 6,573,694 B2 6/2003 Pulkin et al.

FOREIGN PATENT DOCUMENTS

IN 202241026846 * 5/2022

OTHER PUBLICATIONS

Guo et al., A 6-uW Chip-Area-Efficient Output-Capacitorless LDO in 90-nm CMOS Technology, Sep. 2010, IEEE, Journal of Solid-State Circuits, vol. 45, No. 9, 1896-1905 (Year: 2010).*
Liu, et al., "A Transient-Enhanced Fully-Integrated LDO Regulator for SoC Application," ResearchGate, https://www/researchgate.net/publications/324959138. Conference Paper, May 2018. 6 pages.

(Continued)

*Primary Examiner* — Jue Zhang
(74) *Attorney, Agent, or Firm* — Valerie M. Davis; Frank D. Cimino

(57) ABSTRACT

Techniques are described herein for regulating output voltage using a low-dropout (LDO) voltage regulator. In an example, an LDO voltage regulator circuit includes a pass circuit that is driven or otherwise controlled by a first buffer circuit, and a sense circuit that is driven or otherwise controlled by a second buffer circuit. The pass circuit is configured to pass current from a voltage supply terminal to an output voltage terminal, responsive to a first control signal. The sense circuit is configured to sense the current passed by the pass circuit, responsive to a second control signal. The first buffer circuit is configured to provide the first control signal to the pass circuit, responsive to a third control signal, and the second buffer circuit is configured to provide the second control signal to the pass circuit, also responsive to the third control signal.

19 Claims, 6 Drawing Sheets

(56) References Cited

OTHER PUBLICATIONS

Hinojo, et al., "FVF-Based Low-Dropout Voltage Regulator with Fast Charging/Discharging Paths for Fast Line and Load Regulation," ETRI Journal, vol. 39, No. 3, Jun. 2017. pp. 373-382.
Joshi, Kishan, "A Wide Bandwidth High Power Supply Rejection Ratio PMOS Linear Low-Dropout Regulator With Ultra Low Quiescent Current," Dissertation, Arizona State University, Aug. 2020. 70 pages.
Talele, Bhushan, "Load Sharing Low Dropout Regulators Using Accurate Current Sensing," Thesis, Arizona State University, Dec. 2017. 63 pages.
Hazucha, et al., "Area-Efficient Linear Regulator With Ultra-Fast Load Regulation," IEEE Journal of Solid-State Circuits, vol. 40, No. 4, Apr. 2005. pp. 933-940.

* cited by examiner

LOW-DROPOUT VOLTAGE REGULATOR WITH SPLIT-BUFFER STAGE

CROSS-REFERENCE TO RELATED APPLICATION

This application claims the benefit of and priority to India (IN) Provisional Patent Application No. 202241026846 filed on May 10, 2022, which is incorporated herein by reference in its entirety.

TECHNICAL FIELD

This description relates to regulated power supplies, and more particularly, to low-dropout (LDO) voltage regulators.

BACKGROUND

The direct current (DC) output voltage provided by a standard power supply to a load can vary due to any number of factors such as transient conditions, environmental conditions, and changing load conditions. In such cases, a linear voltage regulator can be coupled between the power supply and the load and used to provide a regulated DC output voltage to the load. In this manner, the output voltage of the linear voltage regulator remains unaffected by abrupt or otherwise transient changes in the input supply voltage and the load current.

One type of linear regulator is a low-dropout (LDO) voltage regulator which generally includes a stable reference voltage (e.g., bandgap voltage reference), a differential amplifier (sometimes just called an amplifier), and a pass element (e.g., a power field effect transistor, or power FET). One benefit of LDO voltage regulators relative to switching-type linear regulators is better headroom, in that an LDO can regulate the output voltage even when the input supply voltage is very near the output voltage (e.g., within 1 volt or less). Responsive to the input supply voltage dropping below the dropout mode threshold voltage, the regulator enters dropout mode and ceases to regulate against further reductions in input supply voltage. So, during dropout mode, the output voltage generally equals the input supply voltage minus the voltage drop across the pass element. Dropout mode ends responsive to the input supply voltage ramping to a level that is above the dropout mode threshold.

A high output current LDO regulator often uses a large power FET for the pass element, to allow very low dropout operation. To drive the relatively large gate-to-source capacitance and resulting Miller capacitance due to gate-to-drain capacitance of that power FET, the gate driver uses higher quiescent current even at no-load to reduce delay when ramping to output voltage. Accordingly, many LDO regulators include a relatively large fixed current bias source to drive the power FET at no-load, to achieve better (faster) propagation delay. However, such a high no-load quiescent current is not particularly desirable in many applications (e.g., mobile and other battery-based applications). A cascode flipped voltage follower (CAFVF) LDO regulator employs a low impedance buffer to drive the power FET and achieves better efficiency (lower quiescent current) at comparable transient response times. However, a number of non-trivial issues remain with LDO regulators.

SUMMARY

Techniques are described herein for controlling a low-dropout (LDO) voltage regulator.

In an example, an LDO voltage regulator circuit includes a pass circuit coupled to a voltage supply terminal and having a pass circuit control terminal, and a sense circuit coupled to the voltage supply terminal and having a sense circuit control terminal. A first buffer circuit has a first buffer input and a first buffer output, the first buffer input coupled to a control voltage terminal, and the first buffer output coupled to the pass circuit control terminal. A second buffer circuit has a second buffer input and a second buffer output, the second buffer input coupled to the control voltage terminal, and the second buffer output coupled to the sense circuit control terminal.

In another example, an LDO voltage regulator circuit includes a pass circuit and a sense circuit. The pass circuit is configured to pass current from a voltage supply terminal to an output voltage terminal, responsive to a first control signal. The sense circuit is configured to sense the current passed by the pass circuit, responsive to a second control signal. The LDO voltage regulator circuit further includes a first buffer circuit and a second buffer circuit. The first buffer circuit is configured to provide the first control signal, responsive to a third control signal. The second buffer circuit is configured to provide the second control signal, responsive to the third control signal.

In another example, a voltage regulation method is described that uses a low-dropout (LDO) voltage regulator circuit. The method include passing, via a pass element, current from a voltage supply terminal to an output voltage terminal, responsive to a first control signal. The method further includes sensing, via a sense element, the current passed by the pass circuit, responsive to a second control signal. Responsive to a third control signal, the method further includes providing, via a first buffer circuit, the first control signal. Responsive to the third control signal, the method further includes providing, via a second buffer circuit, the second control signal.

DETAILED DESCRIPTION

Figure 1:
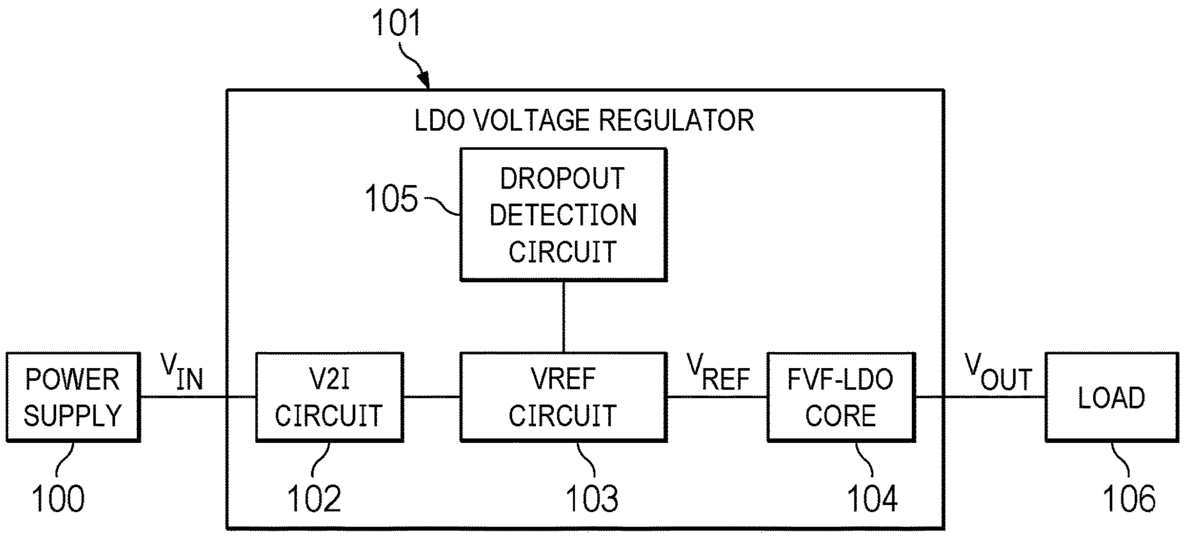
FIG. 1 illustrates a block diagram of a system including a low-dropout (LDO) voltage regulator, in an example.

Techniques are described herein for regulating output voltage using a low-dropout (LDO) voltage regulator. The techniques are particularly useful with respect to cascode flipped voltage follower (CAFVF) LDO regulators, but can be used in any number of voltage regulators that include a pass element having a high-capacitance gate node or other control terminal. In an example, an LDO voltage regulator circuit includes a pass circuit that is driven or otherwise controlled by a first buffer circuit, and a sense circuit that is driven or otherwise controlled by a second buffer circuit. The pass circuit is configured to pass current from a voltage supply terminal to an output voltage terminal, responsive to a first control signal. The sense circuit is configured to sense the current passed by the pass circuit, responsive to a second control signal. The first buffer circuit is configured to provide the first control signal to the pass circuit, responsive to a third control signal, and the second buffer circuit is configured to provide the second control signal to the pass circuit, also responsive to the third control signal. Such a split-buffer architecture can be used to allow for adaptive biasing of the LDO voltage regulator without incurring a costly tradeoff between quiescent current and speed. The split-buffer architecture effectively adds a feedforward path that bypasses the high-capacitance gate node of the pass circuit. In an example, the second buffer stage responds relatively quickly for a low bias current due to the lower gate capacitance of the sense circuit, relative to the higher gate capacitance of the pass circuit. The second buffer stage is controlled by the pass circuit pre-buffer node, which in an example responds relatively quickly to any drop in the output voltage due to the high bandwidth local feedback action of a flipped voltage follower loop. In this way, the speed of the adaptive bias loop is not limited by the large capacitance of the pass circuit control node because the adaptive bias path does not include that node. The high-speed feedforward path rapidly increases the pass circuit buffer bias current as load increases and quickly discharges the pass circuit gate (or other pass circuit control node) and thus reduces undershoots during load transients.

General Overview

As described above, a number of non-trivial issues remain with LDO regulators. For example, in a CAFVF LDO regulator configuration, the gate of the power FET (sometimes called a passFET) is driven by a low impedance buffer that is usually a source follower stage implemented with a p-type FET (PFET) or n-type FET (NFET), to push out the pole attributable to the gate capacitance of the passFET and improve phase margin. In particular, this gate pole can be pushed out to higher frequencies as the load current increases by increasing the bias current of the buffer driving the passFET. One possible adaptive biasing technique can be accomplished by mirroring the passFET current and adding a fraction of that current as bias to the buffer. Unfortunately, the passFET gate is a high capacitance node, so the adaptive bias loop is relatively slow at light loads due to the lower bias current in the buffer, which leads to relatively large undershoots for load transients from light load to full load. As the LDO regulator has a positive feedback loop, the response time is limited by the initial bias current of the buffer stage at no load. Thus, a drawback of this circuit is that the no-load quiescent current of the buffer stage needs to be relatively high to ensure a fast response which significantly increases the no-load quiescent current of the LDO regulator.

Accordingly, techniques are described herein for adaptively biasing an LDO regulator to improve the LDO's load transient performance while maintaining a relatively low no-load quiescent current. The techniques can be implemented with a split-buffer stage having relatively low design complexity and that provides a feedforward path that bypasses the high-capacitance pass circuit control node. In an example, the LDO regulator includes an adaptive bias circuit operatively coupled with a passFET that is driven by a first buffer stage. The adaptive bias circuit includes a second buffer stage that drives a sensing device (senseFET). The senseFET senses the current passing through the passFET. The senseFET buffer stage responds quickly for a relatively low bias current due to the lower gate capacitance of the senseFET, relative to the passFET. The senseFET can have lower gate capacitance relative to the passFET, because the senseFET can be smaller than the passFET, given that the senseFET only receives a fraction of the current that passes through the passFET. The senseFET buffer stage is controlled by the same signal that controls the passFET buffer stage. The speed of the adaptive bias loop is not limited by the relatively higher gate capacitance of the passFET, because the adaptive bias path does not include the passFET gate node; instead, the adaptive bias path is driven by the low capacitance node of the senseFET and forms a feedforward path to the gate of the passFET.

The techniques can be used to achieve improvement in the no-load to full-load transient response time with a marginal or otherwise relatively low increase in die area and quiescent current, and can be implemented with any number of LDO regulator configurations, including a single passFET architecture. The feedforward path does not add significant design complexity and maintains a linear increase in quiescent current with an increase in load current. For example, the split-buffer stage does not require a large smooth switchover circuit like a split-FET architecture, because both buffers can be always-on and thus response-ready. The quiescent current therefore linearly increases with the load current. In contrast, in a split-FET architecture, the quiescent current of the LDO suddenly increases when the large-FET is switched on.

In one example configuration, an LDO voltage regulator circuit includes a pass circuit, a sense circuit, a first buffer circuit, and a second buffer circuit. The pass circuit is coupled to a voltage supply terminal and has a pass circuit control terminal. Likewise, the sense circuit is coupled to the voltage supply terminal and has a sense circuit control terminal. The pass and sense circuits can each be implemented, for instance, with a FET, with their corresponding control terminals being the respective FET gate. The first buffer circuit has a first buffer input coupled to a control voltage terminal, and a first buffer output coupled to the pass circuit control terminal. The second buffer circuit has a second buffer input coupled to the control voltage terminal, and a second buffer output coupled to the sense circuit control terminal. Thus, both the first and second buffer circuits are controlled by the same control voltage terminal signal.

In some such cases, these four circuits are included in an LDO core of an LDO regulator circuit, wherein the LDO core is operatively coupled or otherwise arranged with other LDO regulator circuitry, such as a voltage-to-current converter circuit, a reference voltage generator circuit, and a dropout detection circuit. Such additional circuitry may be implemented with standard or proprietary technology. The degree of integration between the circuits of the LDO regulator circuit may vary from one example to the next. For example, the dropout detection and reference voltage generator circuits may be implemented in one circuit or block rather than two. Similarly, the LDO core may be integrated with the reference voltage generator circuit and/or the dropout detection circuit. In one example, an entire LDO voltage regulator, including the pass circuit, sense circuit, first buffer and second buffer, is implemented within a single integrated circuit package that includes one or more die.

In some examples, the LDO voltage regulator circuit further includes an error amplifier circuit configured to compare an output potential of the sense circuit with an output potential of the pass circuit. In one such case, the pass and sense circuits are implemented with FETs (passFET and senseFET), and the error amplifier circuit includes a pair of FETs configured to compare the drain potentials of the sense circuit and the pass circuit. A cascode circuit can be used to equalize (or otherwise reduce the difference between) the drain potentials of senseFET and passFET for good matching. In one such example case, the cascode circuit is a FET configured to hold the drain of the senseFET equal to the drain of the passFET. A current mirror, which can be implemented with another pair of FETs, can be used to fold the sense current passing through the senseFET into adaptive bias current for the first buffer circuit.

In some such examples, the first buffer circuit includes a first FET and a first current source, and the second buffer circuit includes a second FET and a second current source. The first FET has its gate coupled to the control voltage terminal, its drain coupled to the voltage supply terminal (e.g., supply or reference rail), and its source coupled to the first current source and the pass circuit control terminal (e.g., passFET gate). Similarly, the second FET has its gate coupled to the control voltage terminal, its drain coupled to the voltage supply terminal, and its source coupled to the second current source and the sense circuit control terminal (e.g., senseFET gate). The first and second buffer circuits are capable of always-on operation and thus allow for linear increase in quiescent current with increasing load current.

Circuit Architecture

FIG. 1 illustrates a block diagram of a system that uses a low-dropout (LDO) voltage regulator, in an example. As shown, the system includes an LDO voltage regulator 101 coupled between a power supply 100 and a load 106. In operation, the power supply 100 provides an input supply voltage $V_{IN}$ to the LDO voltage regulator 101, which in turn provides a regulated output voltage $V_{OUT}$ to the load 106. In general, the LDO voltage regulator 101 is configured with a split-buffer arrangement that bypasses or otherwise removes the large capacitance of the pass circuit from the adaptive bias loop, and thus allows for ramping to the desired output voltage $V_{OUT}$ in a relatively short time with no or low undershoot.

The power supply 101 can be any number of power supplies, such as an alternate current to direct current (AC-DC) converter or a DC-DC converter or a battery (rechargeable, or not), or a combination of such supplies. More generally, the power supply 101 can be any power source or circuit having a DC voltage output that can vary due to load conditions or some other reason. The input supply voltage $V_{IN}$ can vary from one example to the next, but in some examples is in the range of 3.5 volts to 35 volts (e.g., 5 volts or 24 volts).

The load 106 can be any circuit or combination of circuits for which a regulated voltage supply is needed, and can vary from one example to the next. In some cases, load 106 includes digital and/or analog circuitry configured to perform a function (e.g., processing, system control, logical computation, storage, etc.) and/or provide an output (e.g., data, control signals, commands, visual displays, aural presentations, etc.). More generally, the load 106 can be any circuit or apparatus or system or device that uses a regulated power source. The load can be expressed in terms of current ($I_{LOAD}$), and may be associated with a capacitance ($C_{LOAD}$).

As further shown in FIG. 1, the LDO voltage regulator 101 includes a voltage-to-current converter (V2I) circuit 102, a reference voltage (VRef) circuit 103, an LDO core 104, and a dropout detection circuit 105. As described above, the LDO voltage regulator 101 is configured with a split-buffer stage. As further described below, the split-buffer stage allows for an adaptive bias that technique uses a separate buffer stage to drive a senseFET or other sense circuit to improve the response time of LDO voltage regulator 101, relative to other configurations that are susceptible to slow response times due to a high capacitance pass circuit control node.

The V2I circuit 102 is configured to provide a stable bias current to the VRef circuit 103, and can have any number of voltage-to-current converter topologies. The bias current is used by the VRef circuit 103 to generate a reference current, which in turn is used to generate a reference voltage $V_{REF}$ used by the LDO core 104. In one example, the V2I circuit 102 is implemented with a voltage-to-current converter circuit that includes bandgap voltage reference (BGVR), an operational amplifier, a FET, and a resistor. The BGVR is configured to provide a stable voltage reference to the input of amplifier and can be implemented with any number of standard or proprietary bandgap voltage reference circuit topologies, such as Brokaw, Widlar, and switched capacitor topologies. The amplifier can have a voltage follower configuration, with its inverting input tied to its output, and receives the output voltage of the BGVR at its non-inverting input. The output of the amplifier drives the gate of the FET. The resistor connects the FET source to ground, and the current through that resistor flows from the source to drain of the FET, thereby providing the bias current to the VRef circuit 103, to help generate the reference voltage $V_{REF}$. More generally, the V2I circuit 102 can be implemented with any standard or proprietary V2I circuit configuration capable of providing a bias current to the VRef circuit 103.

The VRef circuit 103 is configured to generate the reference voltage $V_{REF}$ for the LDO core 104. In an example, the VRef circuit 103 includes an operational amplifier and a FET. The FET is gated by an output signal of the amplifier. The amplifier is configured with first and second input resistances on its inverting and non-inverting inputs, respectively, which in conjunction with the bias current provided by the V2I circuit 102 effectively determine a reference current. The reference current generated by the amplifier is passed through the FET and a reference resistor (which may be external to the VRef circuit 103), which in turn generates the reference voltage $V_{REF}$ that is provided to the LDO core 104. More generally, the VRef circuit 103 can be implemented with any standard or proprietary VRef circuit configuration capable of providing a reference voltage $V_{REF}$ to the LDO core 104.

The dropout detection circuit 105 senses a dropout condition and is configured to cause a higher reference current (sometimes called fast soft-start current, IFss) in the VRef circuit 103, so as to reduce the start-up time with a higher ramp rate on the reference capacitor (in parallel with the reference resistor, external to VRef circuit 103). Also, the dropout detection circuit 105 is configured to limit the overshoot on the reference voltage $V_{REF}$ while the regulator is coming out of dropout, by disconnecting or otherwise disabling the fast soft-start current IFss responsive to the regulator output voltage reaching a given voltage threshold, such as 90% of the target output voltage. In an example, dropout detection circuit 105 includes a comparator that outputs a logic low (or other dropout indicator signal) whenever the output voltage $V_{OUT}$ falls out of regulation by more than a given threshold (e.g., 5%). The dropout indicator signal can be used to switch the fast soft-start current in and out as needed (e.g., by controlling the value of one of the input resistances on the input of the amplifier of the VRef circuit 103). More generally, the dropout detection circuit 105 can be implemented with any standard or proprietary dropout detection circuit configurations capable of adjusting the reference current provided by the VRef circuit 103 during dropout mode.

Figure 2:
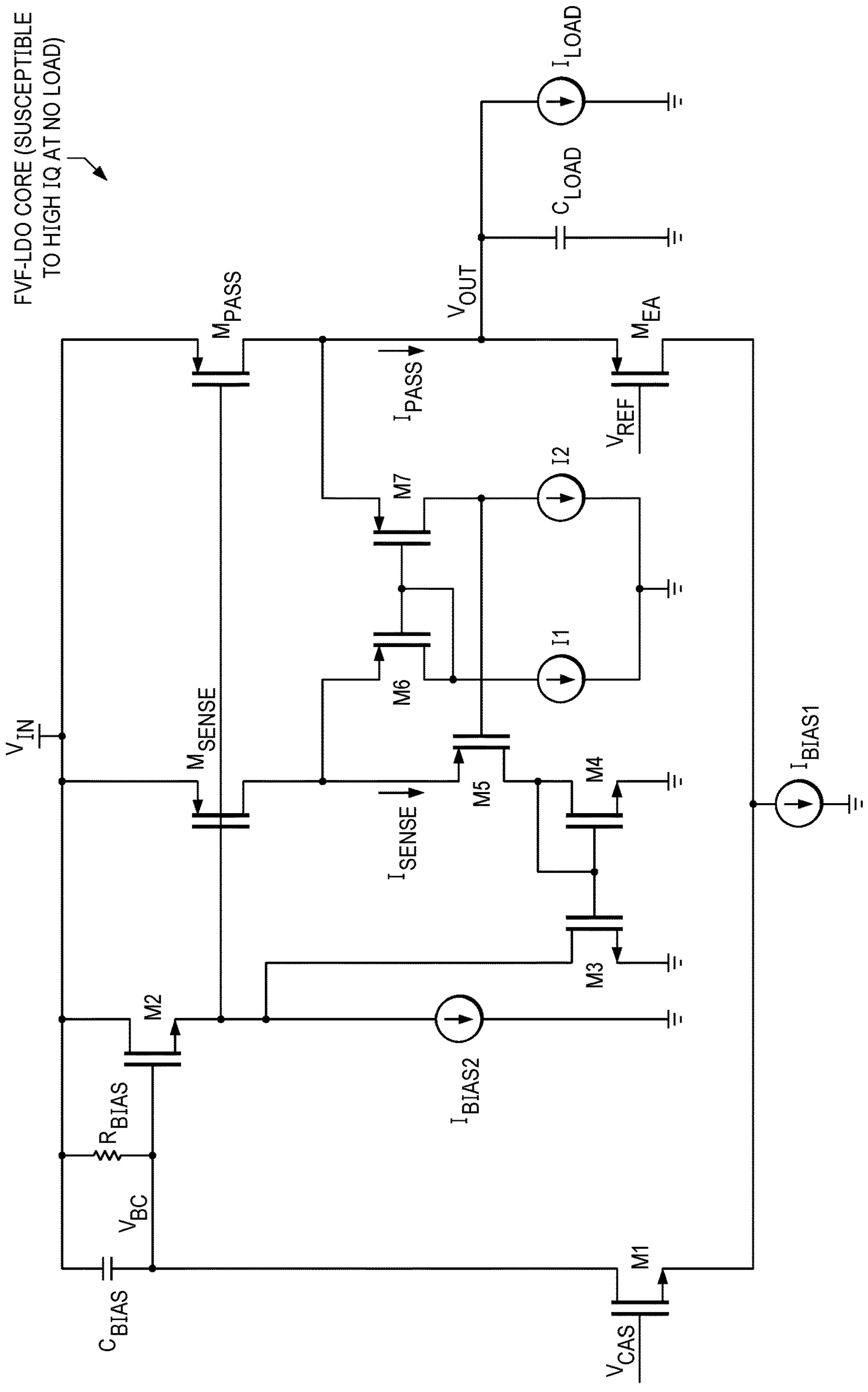
FIG. 2 illustrates a schematic diagram of an LDO voltage regulator that is susceptible to high quiescent current at no load.
Figure 3:
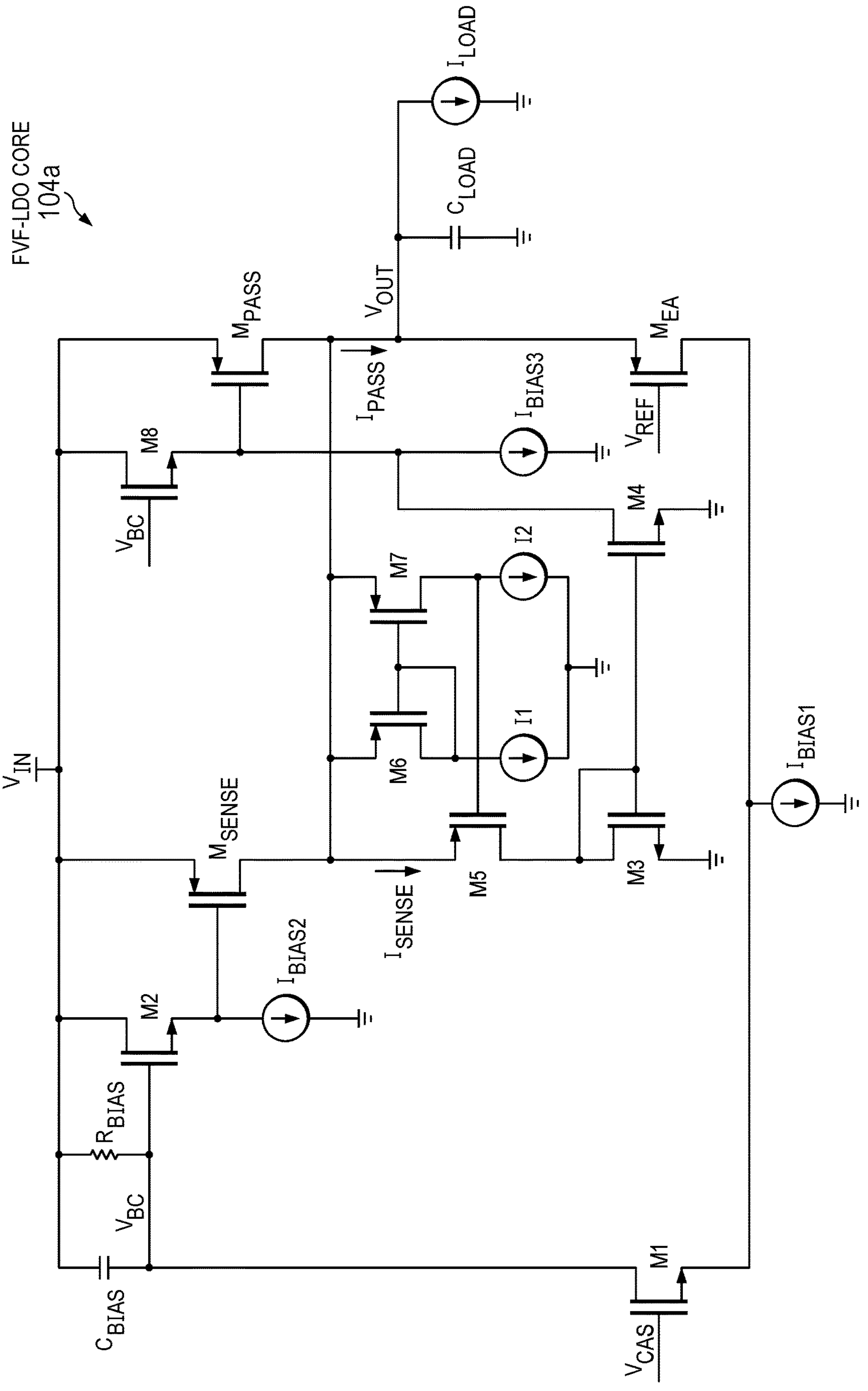
FIG. 3 illustrates a schematic diagram of an LDO voltage regulator configured with a split-buffer stage, in an example.
Figure 4:
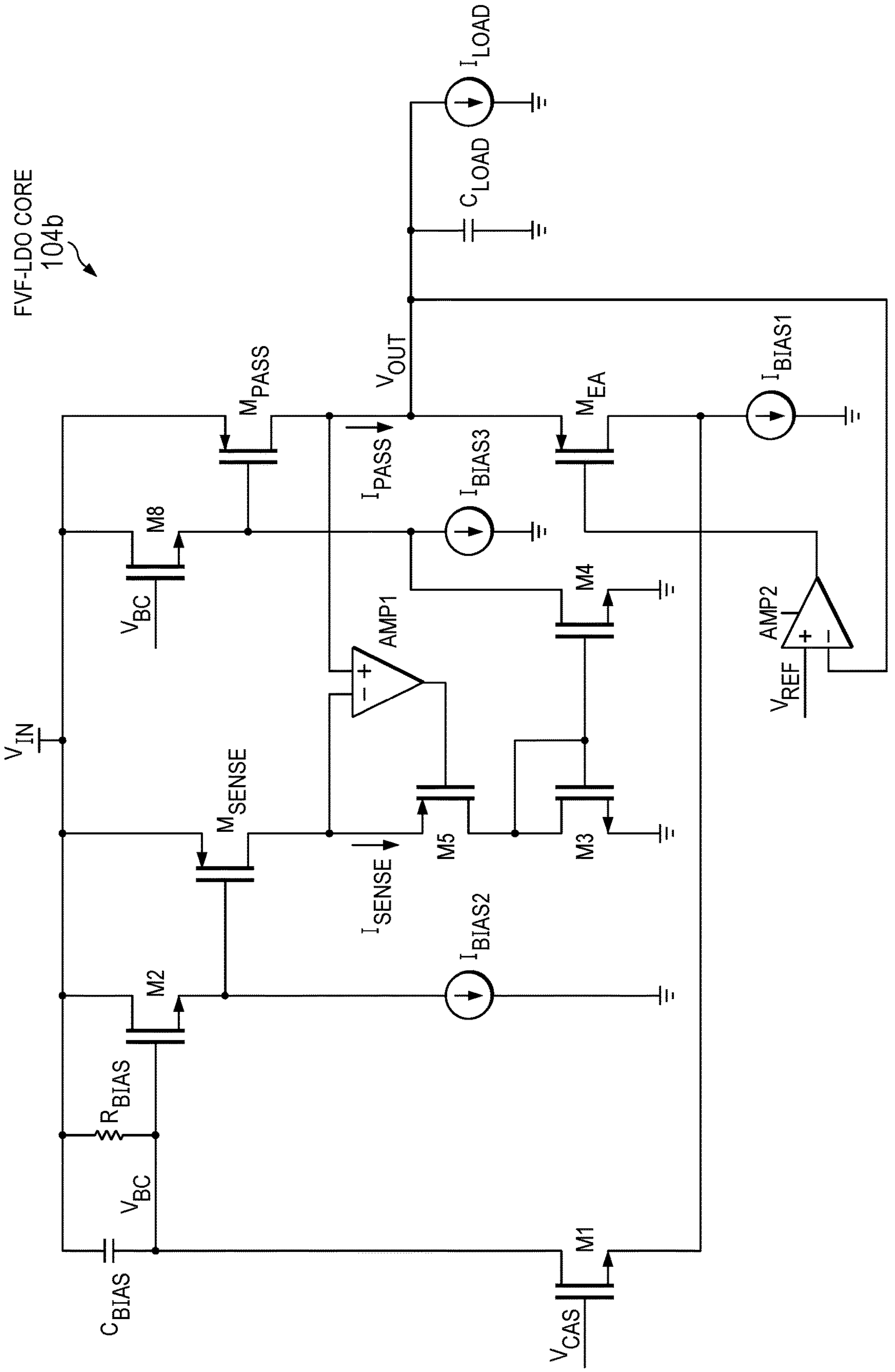
FIG. 4 illustrates a schematic diagram of an LDO voltage regulator configured with a split-buffer stage, in another example.

The LDO core 104 is configured to provide a regulated voltage output $V_{OUT}$ based on the input supply voltage $V_{IN}$ and the reference voltage $V_{REF}$ provided by the VRef circuit 103. In an example, the LDO core 104 includes a pass element and a sense element (such as a passFET and a senseFET, respectively), and a split-buffer stage for driving the passFET and senseFET. Various examples of LDO cores are shown in FIGS. 2, 3 and 4 and described below. More generally, the LDO core 104 can be implemented with any standard or proprietary LDO core configuration that is further configured with a split-buffer stage and feedforward path that bypasses the high-capacitance pass circuit control node as variously described herein. Any number of LDO core configuration that are capable of generating a regulated output voltage based on an input supply voltage $V_{IN}$ and a reference voltage $V_{REF}$ can be so modified.

FIG. 2 illustrates a schematic diagram of an LDO voltage regulator, susceptible to high quiescent current (IQ) at no load. As shown, the LDO voltage regulator has a cascode flipped voltage follower (CAFVF) configuration, and includes a passFET $M_{PASS}$ and a senseFET $M_{SENSE}$, each having its respective source coupled to a voltage supply ($V_{IN}$, such as VCC or VDD) node or terminal, its respective drain coupled to an error amplifier circuit (FETs M6 and M7, current sources I1 and I2), and its respective gate coupled to the output terminal of a buffer circuit that includes FET M2 and current source $I_{BIAS2}$. FET M2 has its gate coupled to the buffer circuit control voltage ($V_{BC}$) node or terminal, its drain coupled to the $V_{IN}$ terminal, and its source coupled to the current source $I_{BIAS2}$ as well as the gates of $M_{PASS}$ and $M_{SENSE}$. FET M6 has its source coupled to the drain of $M_{SENSE}$, its drain coupled to current source I1, and its gate coupled to the gate of FET M7. FET M7 has its source coupled to the drain of $M_{PASS}$, its drain coupled to current source I2, and its gate coupled to the drain of FET M6. The output voltage $V_{OUT}$ node or terminal of the LDO voltage regulator is coupled to the drain of $M_{PASS}$, and is further coupled to an external load which in this example is represented by a capacitance ($C_{LOAD}$) and a current load ($I_{LOAD}$). A control FET $M_{EA}$ has its source coupled to the drain of $M_{PASS}$, its drain coupled to current source $I_{BIAS1}$, and its gate coupled to a reference voltage $V_{REF}$ terminal. Cascode FET M1 has its source coupled to $I_{BIAS1}$ and the drain of FET $M_{EA}$, its drain coupled to the $V_{BC}$ terminal (gate of FET M2), and its gate coupled to a cascode control voltage ($V_{CAS}$) node or terminal. In an example, the control voltage $V_{CAS}$ can be generated internally to the LDO core, using a standard current source passed through a diode-connected NFET, although any suitable control voltage generation circuits can be used.

With further reference to FIG. 2, a bias capacitor $C_{BIAS}$ and a bias resistor $R_{BIAS}$ are coupled in parallel between the $V_{BC}$ terminal (gate of FET M2) and the $V_{IN}$ terminal. FETs M3 and M4 provide a current mirror circuit. FET M3 has its source coupled to ground, its drain coupled to the output of the buffer circuit (source of FET M2), and its gate coupled to the gate of FET M4. FET M4 has its source coupled to ground, its drain coupled to the drain of FET M5, and its gate coupled to its drain. Cascode FET M5 has its gate coupled to the error amplifier circuit (drain of FET M7), its source coupled to the drain of Msense, and its drain coupled to the current mirror circuit (drain of FET M4). In this example, FETs M1-M4 are n-type FETs (NFETs), and FETs M5-M7, $M_{PASS}$, $M_{SENSE}$, and $M_{EA}$ are p-type FETs (PFETs), and each of the current sources (I1, I2, $I_{BIAS1}$, and $I_{BIAS2}$) is referenced to ground, but other example configurations may be configured differently and still provide similar functionality.

The passFET $M_{PASS}$ is configured to pass current $I_{PASS}$ between the $V_{IN}$ terminal and the $V_{OUT}$ terminal, responsive to the drive signal output by the buffer circuit at the source of FET M2. Similarly, the senseFET $M_{SENSE}$ is configured to pass current $I_{SENSE}$ between the $V_{IN}$ terminal and the cascode circuit (source of FET M5), responsive to the buffer circuit drive signal. $M_{SENSE}$ can be much smaller than $M_{PASS}$ (with respect to channel width and length), given that $I_{SENSE}$ generally can be much smaller than $I_{PASS}$. In some examples, for instance, $M_{PASS}$ is one hundred or more times larger than $M_{SENSE}$, or five hundred or more times larger than $M_{SENSE}$, or one thousand or more times larger than $M_{SENSE}$, and the difference between $I_{PASS}$ and $I_{SENSE}$ is proportional to the $M_{PASS}$-to-$M_{SENSE}$ ratio size difference.

The external load represented by $C_{LOAD}$ and $I_{LOAD}$ can be any load, as described above with respect to load 106.

Control FET $M_{EA}$ is configured as an error amplifier that converts variations in $V_{OUT}$ with respect to $V_{REF}$ into current. $V_{REF}$ can be, for example, generated by VRef circuit 103, or by an error amplifier internal to the LDO core.

Cascode FET M1 effectively acts like a current buffer to pass current coming from the control FET $M_{EA}$, and can also protect low voltage devices from high voltage breakdown.

$C_{BIAS}$ and $R_{BIAS}$ are configured to control the location of the pole attributable to gate capacitance of FET M2, for stability. Also, $R_{BIAS}$ can also be used to set a value of $I_{BIAS1}$ to obtain a given dropout voltage specification.

In this example, FET M2 is a relatively large native (having a threshold voltage of zero or nearly zero) NFET biased by $I_{BIAS2}$ to provide a source follower based buffer circuit configured to drive the relatively large passFET $M_{PASS}$. Again, NFETs or PFETs can be used interchangeably. For instance, for an n-type source follower the passFET $M_{PASS}$ gate pull-down is limited by the bias current which may translate into relatively large undershoots during no-load to full-load transients. The opposite applies for a p-type source follower where the passFET $M_{PASS}$ gate pull-up is a limiting factor that may lead to relatively large overshoots.

FETs M6 and M7 are biased by I1 and I2, respectively, and provide the input pair of the error amplifier configured to compare the drain potentials of $M_{SENSE}$ and $M_{PASS}$. The output of the error amplifier can be taken at the source of FET M6, hence giving a unity negative feedback.

FET M5 is configured to equalize the drain potentials of $M_{SENSE}$ and $M_{PASS}$ for good matching. In particular, FET M5 acts as a cascode for $M_{SENSE}$ and is used to hold the drain of $M_{SENSE}$ equal to the drain of $M_{PASS}$.

The current mirror provided by FETs M3 and M4 is configured to fold the sense current $I_{SENSE}$ into adaptive bias current for FET M2. In this manner, the adaptive bias current can be computed as $I_{BIAS2}+I_{SENSE}$.

So, in operation, the adaptive biasing of the buffer circuit is achieved by mirroring the $I_{PASS}$ current through $M_{SENSE}$ to provide a smaller $I_{SENSE}$ current, and folding this $I_{SENSE}$ current back into the source follower bias current of the buffer circuit, which drives not only the $M_{SENSE}$ gate but also the $M_{PASS}$ gate. This forms a positive feedback loop. Since the $M_{PASS}$ gate is a relatively high capacitance node, the adaptive bias loop is very slow, especially at light loads due to the lower overall bias current ($I_{BIAS2}+I_{SENSE}$) in the buffer circuit. This leads to relatively large undershoots for load transients from light load to full load. Thus, to improve the speed of the adaptive bias loop, the no-load bias current of the buffer circuit ($I_{BIAS2}$) must be increased which increases overall no-load quiescent current of the LDO regulator.

FIG. 3 illustrates a schematic diagram of an LDO voltage regulator 104*a* configured with a split-buffer stage, in an example. As shown, the LDO voltage regulator 104*a* is similar to the example shown in FIG. 2, except that a split-buffer stage configuration is utilized which provides a feedforward path that bypasses the high-capacitance gate node of the pass circuit. In more detail, the LDO voltage regulator 104*a* has a CAFVF configuration, and includes a passFET $M_{PASS}$ and a senseFET $M_{SENSE}$, each having its respective source coupled to the $V_{IN}$ terminal, and its respective drain coupled to the error amplifier circuit (FETs M6 and M7, current sources I1 and I2). The gate of $M_{SENSE}$ is coupled to the output terminal of a first buffer circuit (FET M2 and current source $I_{BIAS2}$), and the gate of $M_{PASS}$ is coupled to the output terminal of a second buffer circuit (FET M8 and current source $I_{BIAS3}$). These first and second buffer circuits are referred to herein as a split-buffer stage.

FET M2 has its gate coupled to the $V_{BC}$ terminal, its drain coupled to the $V_{IN}$ terminal, and its source coupled to the current source $I_{BIAS2}$. Similarly, FET M8 has its gate coupled to the $V_{BC}$ terminal, its drain coupled to the $V_{IN}$ terminal, and its source coupled to the current source $I_{BIAS3}$. FET M6 has its source coupled to the drain of $M_{SENSE}$, its drain coupled to current source I1, and its gate coupled to the gate of FET M7. FET M7 has its source coupled to the drain of $M_{PASS}$, its drain coupled to current source I2, and its gate coupled to the drain of FET M6. The output voltage $V_{OUT}$ node or terminal of the LDO voltage regulator is coupled to the drain of $M_{PASS}$, and is further coupled to an external load (represented by $C_{LOAD}$ and $I_{LOAD}$).

A control FET $M_{EA}$ has its source coupled to the drain of $M_{PASS}$, its drain coupled to current source $I_{BIAS1}$, and its gate coupled to a reference voltage $V_{REF}$ terminal. Cascode FET M1 has its source coupled to $I_{BIAS1}$ and the drain of FET $M_{EA}$, its drain coupled to the $V_{BC}$ terminal (gate of FET M2), and its gate coupled to a cascode control voltage ($V_{CAS}$) node or terminal. As described above, the control voltage $V_{CAS}$ can be generated internally to the LDO core, using a standard current source passed through a diode-connected NFET, although any suitable control voltage generation circuits can be used. $V_{CAS}$ can be kept high enough to provide sufficient headroom for $I_{BIAS1}$ to operate in saturation. A bias capacitor $C_{BIAS}$ and a bias resistor $R_{BIAS}$ are coupled in parallel between the $V_{BC}$ terminal (gate of FET M2) and the $V_{IN}$ terminal.

FETs M3 and M4 provide a current mirror circuit. FET M4 has its source coupled to ground, its drain coupled to the output of the second buffer circuit (source of FET M8), and its gate coupled to the gate of FET M3. FET M3 has its source coupled to ground, its drain coupled to the drain of M5, and its gate coupled to its drain. Cascode FET M5 has its gate coupled to the error amplifier circuit (drain of FET M7), its source coupled to the drain of $M_{SENSE}$, and its drain coupled to the current mirror circuit (drain of FET M3). In this example, FETs M1-M4 and M8 are NFETs, and FETs M5-M7, $M_{PASS}$, $M_{SENSE}$, and $M_{EA}$ are PFETs, and each of the current sources (I1, I2, $I_{BIAS1}$, $I_{BIAS2}$, and $I_{BIAS3}$) is referenced to ground, but other examples may be configured differently and still provide similar functionality with a split-buffer configuration and feedforward path as variously described herein.

The senseFET $M_{SENSE}$ is configured to pass current $I_{SENSE}$ between the $V_{IN}$ terminal and the current mirror circuit, responsive to the drive signal output by the first buffer circuit at the source of FET M2. The passFET $M_{PASS}$ is configured to pass current $I_{PASS}$ between the $V_{IN}$ terminal and the $V_{OUT}$ terminal, responsive to the drive signal output by the second buffer circuit at the source of FET M8. $M_{SENSE}$ can be much smaller than $M_{PASS}$ (with respect to channel width and length), given that $I_{SENSE}$ generally can be much smaller than $I_{PASS}$. In some examples, for instance, $M_{PASS}$ is one hundred or more times larger than $M_{SENSE}$, or five hundred or more times larger than $M_{SENSE}$, or one thousand or more times larger than $M_{SENSE}$, and the difference between $I_{PASS}$ and $I_{SENSE}$ is proportional to the $M_{PASS}$-to-$M_{SENSE}$ ratio size difference.

The external load represented by $C_{LOAD}$ and $I_{LOAD}$ can be any load, as described above with respect to load 106. In an example, $C_{LOAD}$ is greater than 0.5 microfarads (μF) and $I_{LOAD}$ can range from about 1 microamp to 100 milliamps (mA).

Control FET $M_{EA}$ is configured as an error amplifier that converts variations in $V_{OUT}$ with respect to $V_{REF}$ into current. $V_{REF}$ can be, for example, generated by VRef circuit 103, or by an error amplifier internal to the LDO core.

Cascode FET M1 effectively acts like a current buffer to pass current coming from the control FET $M_{EA}$, and can also protect low voltage devices from high voltage breakdown.

$C_{BIAS}$ and $R_{BIAS}$ are configured to control the location of the pole attributable to gate capacitance of FETs M2 and M8, for stability. Also, $R_{BIAS}$ can also be used to set a value of $I_{BIAS1}$ to obtain a given dropout voltage specification.

In this example, FET M2 is a relatively small native NFET biased by $I_{BIAS2}$ to provide a source follower based buffer circuit configured to drive the relatively small senseFET $M_{SENSE}$. FET M8 is a relatively large native NFET biased by $I_{BIAS3}$ to provide a source follower based buffer circuit configured to drive the relatively large passFET $M_{PASS}$. The description above with respect to sizing of $M_{SENSE}$ (relatively small) and $M_{PASS}$ (relatively large) is equally applicable to FETs M2 (relatively small) and M8 (relatively large). Also, NFETs or PFETs can be used interchangeably, as described above. Also, because the $M_{PASS}$ and $M_{SENSE}$ gates are driven by separate buffers, there may be a slight mismatch in the mirroring ratio (e.g., 1-10% mismatch). This is not a major concern because the current density of FET M8 increases in comparison to FET M2 as more adaptive bias current is added. This causes the effective $M_{SENSE}$-to-$M_{PASS}$ ratio to decrease as load current increases, so a slight mismatch in the mirroring ratio does not cause a significant increase in the full load quiescent current.

FETs M6 and M7 are biased by I1 and I2, respectively, and provide the input pair of an error amplifier configured to compare the drain potentials of $M_{SENSE}$ and $M_{PASS}$. The output of the error amplifier can be taken at the source of FET M6, hence giving a unity negative feedback. FET M5 is configured to equalize the drain potentials of $M_{SENSE}$ and $M_{PASS}$ for good matching. In particular, FET M5 acts as a cascode for $M_{SENSE}$ and is used to hold the drain of $M_{SENSE}$ equal to the drain of $M_{PASS}$.

The current mirror provided by FETs M3 and M4 is configured to fold the sense current $I_{SENSE}$ into adaptive bias current for FET M8. In this manner, the adaptive bias current can be computed as $I_{BIAS3}+I_{SENSE}$.

So, in operation, the adaptive biasing is achieved using a split-buffer stage that provides a feedforward path. In the example of FIG. 3, the feedforward path is effectively formed by the following pathway: from the $V_{BC}$ node through the gate-to-source of FET M2, and through the gate-to-drain of Msense, and through source-to-drain of FET M5, and through the drain-to-gate of FET M3, and through the gate-to-drain of M4 to the drain of M8 and the gate of $M_{PASS}$. So, the $I_{PASS}$ current through $M_{SENSE}$ is mirrored to provide a smaller $I_{SENSE}$ current, and this $I_{SENSE}$ current folded into the source follower bias current ($I_{BIAS3}$) of the second buffer circuit, which drives the $M_{PASS}$ gate. The first buffer circuit is decoupled from the high-capacitance node of the $M_{PASS}$ gate, so the adaptive bias path does not include that high-capacitance node. Instead, the adaptive bias path is driven by the low capacitance $V_{BC}$ node and forms a feedforward path to the gate of $M_{PASS}$. The senseFET senses the current passing through the passFET. Recall that FET M2 can respond quickly for a relatively low bias current due to the lower gate capacitance of $M_{SENSE}$, relative to the $M_{PASS}$. FET M2 is controlled by the $M_{PASS}$ pre-buffer node (gate of FET M8), which in an example responds relatively quickly to any drop in the output voltage due to the high bandwidth local feedback action of a flipped voltage follower loop. In this way, the speed of the adaptive bias loop is not limited by the large capacitance at the M8 gate terminal. The high-speed feedforward path rapidly increases the FET M2 bias current as the load increases and quickly discharges the FET M8 gate and thus reduces undershoots during no-load to full-load transients. In this manner, an adaptive gate buffer configuration is provided for a flipped voltage follower stage and that is capable of rail-to-rail output swing and very low propagation delay with low no-load quiescent current, such as 2 microamps (μA) or less throughout input range.

FIG. 4 illustrates a schematic diagram of an LDO voltage regulator configured with a split-buffer stage, in another example. As shown, the LDO voltage regulator 104*b* is similar to LDO voltage regulator 104*a* shown in FIG. 3, except that FETs M6 and M7 along with their respective current sources I1 and I2 have been replaced with an error amplifier AMP1, and $V_{REF}$ is provided by an error amplifier AMP2 instead of VRef circuit 103. The previous relevant discussion for components and features similar to those shown in FIG. 3 is equally applicable here.

AMP1 is configured to compare the drain potential of $M_{SENSE}$ (coupled to inverting input of AMP1) and the drain potential of $M_{PASS}$ (coupled to non-inverting input of AMP1). The output of AMP1 is coupled to the gate of FET M5, which is the cascode for $M_{SENSE}$ and it is used to hold the drain of $M_{SENSE}$ equal to the drain of $M_{PASS}$. AMP2 is configured to amplify the difference between $V_{REF}$ (coupled to non-inverting input of AMP2) and $V_{OUT}$ (coupled to inverting input of AMP1). In this example, AMP2 is integrated into the LDO core 104*b*. In another example, AMP2 may be implemented as an additional block inserted, for example, between VRef circuit 103 and LDO core 104 of the example shown in FIG. 1. Other error amplifier and cascode configurations may be used as well, and the degree of integration may vary from one example to the next.

Methodology

Figure 5:
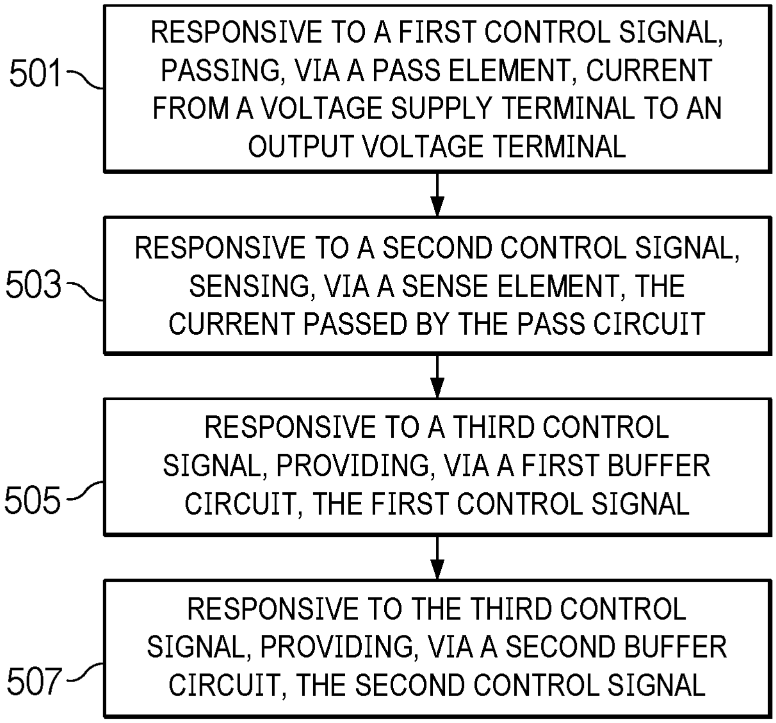
FIG. 5 illustrates a method for regulating a voltage using an LDO voltage regulator configured with a split-buffer stage, in an example.

FIG. 5 illustrates a method for regulating a voltage using an LDO voltage regulator configured with a split-buffer stage, in an example. The method can be carried out, for example, by the LDO regulator 101 of FIG. 1, or any LDO regulator having an LDO core or circuitry configured with the functionality as shown in FIGS. 3 and 4. More generally, the method can be carried out by any LDO regulator having a split-buffer stage with a feedforward path that bypasses a high-capacitance control node of the pass circuit used in a given LDO design.

As shown, the method includes at 501, responsive to a first control signal, passing, via a pass element, current from a voltage supply terminal to an output voltage terminal. The pass element may be a passFET or other pass circuit (e.g., $M_{PASS}$). The method further includes at 503, responsive to a second control signal, sensing, via a sense element, the current passed by the pass circuit. The sense element may be a senseFET or other sense circuit (e.g., $M_{SENSE}$). The method further includes at 505, responsive to a third control signal, providing, via a first buffer circuit, the first control signal. The method further includes at 507, responsive to the third control signal, providing, via a second buffer circuit, the second control signal.

The first and second buffer circuits provide a split-buffer stage (e.g., M2 and $I_{BIAS2}$ provide one buffer and M8 and $I_{BIAS3}$ provide another buffer). Each of 501, 503, 505, and 507 can be carried out in a contemporaneous fashion to provide a regulated output voltage. So, the first and second buffer circuits are controlled by the same (third) control signal (e.g., control signal at $V_{BC}$ node), and output the first and second control signals, respectively. The first and second control signals are used to drive the pass element and the sense element, respectively. The adaptive bias loop is not limited by the high capacitance of the pass element control node (e.g., gate of $M_{PASS}$) since the adaptive bias path does not include this node, instead, it is driven by a low capacitance node (e.g., $V_{BC}$ node) and forms a feedforward path to the pass element control node (e.g., gate of $M_{PASS}$).

The method may further include comparing, via an error amplifier circuit (e.g., AMP1, or FETs M6 and M7 along with current sources I1 and I2), an output potential of the sense element with an output potential of the pass element. The method may further include reducing, via a transistor (e.g., cascode FET M5), difference between the output potential of the sense element and the output potential of the pass element. The method may further include adding, via a current mirror circuit (e.g., FETs M3 and M4), output current of the sense element into output current of the first buffer circuit, to adaptively adjust the first control signal. The method may further include, responsive to a voltage reference signal (e.g., $V_{REF}$), converting potential variations at the output voltage terminal to feedback current. This converting may be accomplished by, for example, FET $M_{EA}$, responsive to the $V_{REF}$.

Figure 6:
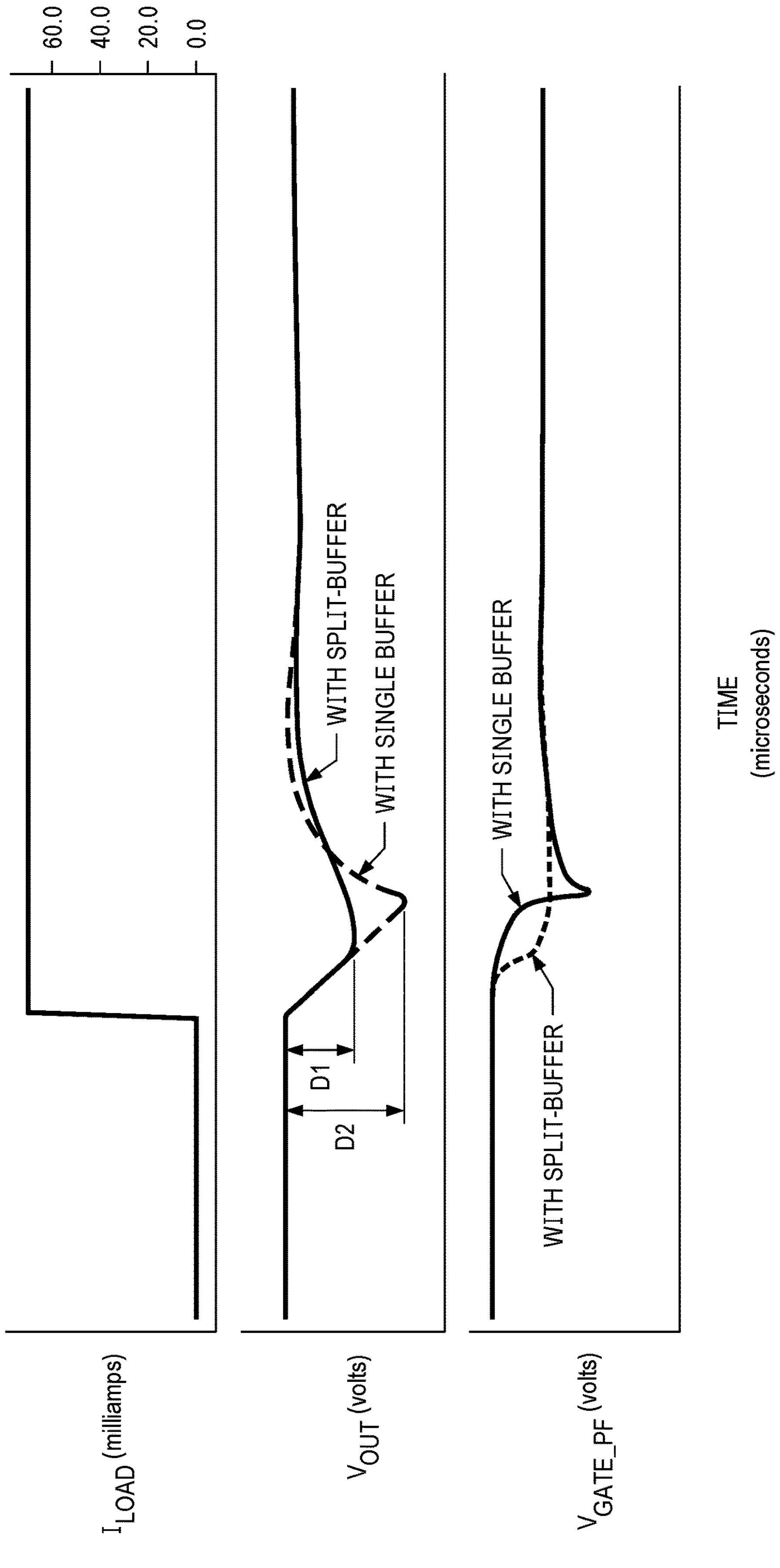
FIG. 6 illustrates comparative plots that show example performance differences with respect LDO voltage regulators configured with a single buffer as shown in the example of FIG. 2 and LDO voltage regulators configured with a split-buffer stage as shown in the examples of FIGS. 3 and 4.

FIG. 6 illustrates comparative plots that show example performance differences with respect LDO voltage regulators configured with a single buffer as shown in the example of FIG. 2 and LDO voltage regulators configured with a split-buffer stage as shown in the examples of FIGS. 3 and 4. In more detail, the top plot shows the load transient in which the load current $I_{LOAD}$ in milliamps (mA) transitions from a zero or low load condition of about 1 μA (or less) to about 70 mA, at a rate of about 1 amp per microsecond (μS) and a capacitive load ($C_{LOAD}$) of about 1 microfarad (μF).

The middle plots of FIG. 6 show a first plot for $V_{OUT}$ of an LDO regulator having a single buffer configuration and a second plot for $V_{OUT}$ of an LDO regulator having a split-buffer configuration, in an example. As shown, the output voltage of the LDO regulator having a single buffer configuration has an output voltage undershoot (or droop) of D2, while the output voltage of the LDO regulator having a split-buffer configuration has an output voltage undershoot (or droop) of D1. D1 is about one-half of D2. In one such example case, VOGT is about 5 volts prior to the undershoot, D1 is in the range of about 40 to 60 millivolts (mV) (e.g., 50 mV), and D2 is in the range of about 80 to 120 millivolts (mV) (e.g., 100 mV).

The bottom plots of FIG. 6 show a first plot for the gate potential of the passFET ($V_{GATE\_PF}$) of an LDO regulator having a single buffer configuration and a second plot for the $V_{GATE\_PF}$ of an LDO regulator having a split-buffer configuration, in an example. As shown, the $V_{GATE\_PF}$ of an LDO regulator having a split-buffer configuration reacts much more quickly than the $V_{GATE\_PF}$ of an LDO regulator having a single buffer configuration, and with less ringing when transitioning from a first control potential to a second. In an example, the $V_{GATE\_PF}$ for both configurations is about 12.7 volts prior to the undershoot, and about 12.0 volts after the undershoot. In one such example, the $V_{GATE\_PF}$ of an LDO regulator having a split-buffer configuration transitions from the first control potential to the second in about 0.6 microseconds (μS), while the $V_{GATE\_PF}$ of an LDO regulator having a single buffer configuration transitions from the first control potential to the second in about 1.8 μS.

Further Examples

Example 1 is a low-dropout (LDO) voltage regulator circuit. The LDO voltage regulator circuit includes a pass circuit coupled to a voltage supply terminal and having a pass circuit control terminal, and a sense circuit coupled to the voltage supply terminal and having a sense circuit control terminal. A first buffer circuit has a first buffer input and a first buffer output, the first buffer input coupled to a control voltage terminal, and the first buffer output coupled to the pass circuit control terminal. A second buffer circuit has a second buffer input and a second buffer output, the second buffer input coupled to the control voltage terminal, and the second buffer output coupled to the sense circuit control terminal. The voltage supply terminal may be a supply terminal (e.g., VDD) or a reference terminal (e.g., ground).

Example 2 includes the LDO voltage regulator circuit of Example 1, and further includes an error amplifier circuit having a first input, a second input, and an error amplifier output, wherein the pass circuit is coupled between the voltage supply terminal and the first input of the comparator circuit, and the sense circuit is coupled between the voltage supply terminal and the second input of the comparator circuit.

Example 3 includes the LDO voltage regulator circuit of Example 2, wherein the error amplifier circuit includes: a first current source; a second current source; a first field effect transistor (FET) having one of its source or drain coupled to the sense circuit and the other of its source or drain coupled to the first current source; and a second FET having its gate coupled to the gate of the first FET and the first current source, one of its source or drain coupled to the pass circuit, and the other of its source or drain coupled to the second current source.

Example 4 includes the LDO voltage regulator circuit of Example 3, and further includes a current mirror circuit coupled to the first buffer output, and a third FET having its gate coupled to the second current source, one of its source or drain coupled to the sense circuit, and the other of its source or drain coupled to the current mirror.

Example 5 includes the LDO voltage regulator circuit of any one of Examples 1 through 4, and further includes a capacitor coupled between the voltage supply terminal and the control voltage terminal, and a resistor coupled between the voltage supply terminal and the control voltage terminal.

Example 6 includes the LDO voltage regulator circuit of any one of Examples 1 through 5, wherein the control voltage terminal is a first control voltage terminal, and the LDO voltage regulator circuit further includes a current source, and a field effect transistor (FET) having its gate coupled to a second control voltage terminal, one of its source or drain coupled to the first control voltage terminal, and the other of its source or drain coupled to the current source.

Example 7 includes the LDO voltage regulator circuit of any one of Examples 1 through 6, wherein: the first buffer circuit includes a first field effect transistor (FET) and a first current source, the first FET having its gate coupled to the control voltage terminal, its drain coupled to the voltage supply terminal, and its source coupled to the first current source and the pass circuit control terminal; and the second buffer circuit includes a second FET and a second current source, the second FET having its gate coupled to the control voltage terminal, its drain coupled to the voltage supply terminal, and its source coupled to the second current source and the sense circuit control terminal.

Example 8 includes the LDO voltage regulator circuit of any one of Examples 1 through 7, wherein the pass circuit is coupled between the voltage supply terminal and an output voltage terminal, and the LDO voltage regulator circuit further includes a control circuit coupled to the output voltage terminal and having a voltage reference input.

Example 9 is a system that includes the LDO voltage regulator circuit of any one of Examples 1 through 8, as well as a power supply coupled to the voltage supply terminal of the LDO voltage regulator circuit, and in some cases a load coupled to an output voltage terminal of the LDO voltage regulator circuit.

Example 10 is a low-dropout (LDO) voltage regulator circuit that includes a pass circuit and a sense circuit. This pass circuit is configured to pass current from a voltage supply terminal to an output voltage terminal, responsive to a first control signal. The sense circuit is configured to sense the current passed by the pass circuit, responsive to a second control signal. The LDO voltage regulator circuit further includes a first buffer circuit and a second buffer circuit. The first buffer circuit is configured to provide the first control signal, responsive to a third control signal. The second buffer circuit is configured to provide the second control signal, responsive to the third control signal.

Example 11 includes the LDO voltage regulator circuit of Example 10, and further includes an error amplifier circuit configured to compare an output potential of the sense circuit with an output potential of the pass circuit.

Example 12 includes the LDO voltage regulator circuit of Example 11, wherein the error amplifier circuit comprises: a first current source; a second current source; a first field effect transistor (FET) having one of its source or drain configured to receive the output potential of the sense circuit and the other of its source or drain coupled to the first current source; and a second FET having its gate coupled to the first current source and the gate of the first FET, one of its source or drain configured to receive the output potential of the pass circuit, and the other of its source or drain coupled to the second current source.

Example 13 includes the LDO voltage regulator circuit of Example 12, and further includes: a current mirror circuit configured to fold an output current of the sense circuit into an output current of the first buffer circuit, to adaptively control the first control signal; and a third FET configured to reduce difference between the output potential of the sense circuit and the output potential of the pass circuit.

Example 14 includes the LDO voltage regulator circuit of any one of Examples 10 through 13, and further includes: a current source; a first field effect transistor (FET) having its source or drain coupled to the current source and configured to convert potential variations at the output voltage terminal to feedback current, responsive to a voltage reference signal at the gate of the FET; and a second FET having its gate configured to receive a fourth control signal, one of its source or drain coupled to a control terminal of the second buffer circuit that receives the third control signal, and the other of its source or drain coupled to the current source.

Example 15 is a system that includes the LDO voltage regulator circuit of any one of Examples 10 through 14, along with a power supply coupled to the voltage supply terminal of the LDO voltage regulator circuit, and in some cases a load coupled to an output voltage terminal of the LDO voltage regulator circuit.

Example 16 is a voltage regulation method using a low-dropout (LDO) voltage regulator circuit. The method includes passing, via a pass element, current from a voltage supply terminal to an output voltage terminal, responsive to a first control signal. The method further includes sensing, via a sense element, the current passed by the pass circuit, responsive to a second control signal. Responsive to a third control signal, the method further includes providing, via a first buffer circuit, the first control signal. Responsive to the third control signal, the method further includes providing, via a second buffer circuit, the second control signal.

Example 17 includes the method of Example 16, and further includes comparing, via an error amplifier circuit, an output potential of the sense element with an output potential of the pass element.

Example 18 includes the method of Example 17, and further includes reducing, via a transistor, difference between the output potential of the sense element and the output potential of the pass element.

Example 19 includes the method of any one of Examples 16 through 18, and further includes adding, via a current mirror circuit, output current of the sense element into output current of the first buffer circuit, to adaptively adjust the first control signal.

Example 20 includes the method of any one of Examples 16 through 19, and further includes, responsive to a voltage reference signal, converting potential variations at the output voltage terminal to feedback current.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end user and/or a third party.

While the use of particular transistors is described herein, other transistors (or equivalent devices) may be used instead. For example, a p-channel field effect transistor (PFET) may be used in place of an n-channel field effect transistor (NFET) with little or no changes to the circuit. Furthermore, other types of transistors may be used (such as bipolar junction transistors (BJTs)). Furthermore, the devices may be implemented in/over a silicon substrate (Si), a silicon carbide substrate (SiC), a gallium nitride substrate (GaN) or a gallium arsenide substrate (GaAs).

References herein to a field effect transistor (FET) being "ON" means that the conduction channel of the FET is present and drain current may flow through the FET. References herein to a FET being "OFF" means that the conduction channel is not present and drain current does not flow through the FET. A FET that is OFF, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. A circuit, comprising:

a pass circuit coupled to a voltage supply terminal and having a pass circuit control terminal and a pass circuit output;

a sense circuit coupled to the voltage supply terminal and having a sense circuit control terminal, wherein the sense circuit is coupled to the pass circuit output;

a first buffer circuit having a first buffer input and a first buffer output, the first buffer input coupled to a control voltage terminal, and the first buffer output coupled to the pass circuit control terminal, wherein the first buffer circuit includes a first buffer circuit transistor having a control terminal coupled to the control voltage terminal, a first current terminal coupled to the voltage supply terminal, and a second current terminal coupled to the pass circuit control terminal, a first current source, and a current mirror coupled in parallel with the first current source; and a second buffer circuit having a second buffer input and a second buffer output, the second buffer input coupled to the control voltage terminal, and the second buffer output coupled to the sense circuit control terminal.

2. The circuit of claim 1, comprising:

an error amplifier circuit having a first input, a second input, and an error amplifier output, wherein the pass circuit is coupled between the voltage supply terminal and the first input of a comparator circuit, and the sense circuit is coupled between the voltage supply terminal and the second input of the comparator circuit.

3. The circuit of claim 2, wherein the error amplifier circuit comprises:

a second current source;

a third current source;

a first field effect transistor (FET) having one of its source or drain coupled to the sense circuit and the other of its source or drain coupled to the first current source; and a second FET having its gate coupled to the gate of the first FET and the first current source, one of its source or drain coupled to the pass circuit, and the other of its source or drain coupled to the second current source.

4. The circuit of claim 3, comprising:

a third FET having its gate coupled to the second current source, one of its source or drain coupled to the sense circuit, and the other of its source or drain coupled to the current mirror.

5. The circuit of claim 1, comprising:

a capacitor coupled between the voltage supply terminal and the control voltage terminal; and a resistor coupled between the voltage supply terminal and the control voltage terminal.

6. The circuit of claim 1, wherein:

the first buffer circuit transistor is a first field effect transistor (FET); and the second buffer circuit includes a second FET and a second current source, the second FET having its gate coupled to the control voltage terminal, its drain coupled to the voltage supply terminal, and its source coupled to the second current source and the sense circuit control terminal.

7. The circuit of claim 1, wherein the pass circuit is coupled between the voltage supply terminal and an output voltage terminal, the circuit comprising:

a control circuit coupled to the output voltage terminal and having a voltage reference input.

8. A system comprising:

the circuit of claim 1;

a power supply coupled to the voltage supply terminal of the circuit; and a load coupled to an output voltage terminal of the circuit.

9. A low-dropout (LDO) voltage regulator circuit, comprising:

a pass circuit configured to pass current from a voltage supply terminal to an output voltage terminal, responsive to a first control signal, wherein the pass circuit includes a pass circuit control terminal and a pass circuit output;

a sense circuit configured to sense the current passed by the pass circuit, responsive to a second control signal, wherein the sense circuit is coupled to the pass circuit output;

a first buffer circuit configured to provide the first control signal, responsive to a third control signal, wherein the first buffer circuit includes a first buffer circuit transistor having a control terminal coupled to a control voltage terminal, a first current terminal coupled to the voltage supply terminal, and a second current terminal coupled to the pass circuit control terminal, a first current source, and a current mirror coupled in parallel with the first current source; and a second buffer circuit configured to provide the second control signal, responsive to the third control signal.

10. The LDO voltage regulator circuit of claim 9, comprising:

an error amplifier circuit configured to compare an output potential of the sense circuit with an output potential of the pass circuit.

11. The LDO voltage regulator circuit of claim 10, wherein the error amplifier circuit comprises:

a first current source;

a second current source;

a first field effect transistor (FET) having one of its source or drain configured to receive the output potential of the sense circuit and the other of its source or drain coupled to the first current source; and a second FET having its gate coupled to the first current source and the gate of the first FET, one of its source or drain configured to receive the output potential of the pass circuit, and the other of its source or drain coupled to the second current source.

12. The LDO voltage regulator circuit of claim 11, comprising:

a current mirror circuit configured to fold an output current of the sense circuit into an output current of the first buffer circuit, to adaptively control the first control signal; and a third FET configured to reduce difference between the output potential of the sense circuit and the output potential of the pass circuit.

13. The LDO voltage regulator circuit of claim 9, comprising:

a current source;

a first field effect transistor (FET) having its source or drain coupled to the current source and configured to convert potential variations at the output voltage terminal to feedback current, responsive to a voltage reference signal at a gate of the FET; and a second FET having its gate configured to receive a fourth control signal, one of its source or drain coupled to a control terminal of the second buffer circuit that receives the third control signal, and the other of its source or drain coupled to the current source.

14. A system comprising:

the LDO voltage regulator circuit of claim 9;

a power supply coupled to the voltage supply terminal of the LDO voltage regulator circuit; and a load coupled to an output voltage terminal of the LDO voltage regulator circuit.

15. A voltage regulation method using a low-dropout (LDO) voltage regulator circuit, the method comprising:

passing, via a pass element, current from a voltage supply terminal to an output voltage terminal, responsive to a first control signal, wherein the pass element includes a pass element control terminal and a pass element output;

sensing, via a sense element, the current passed by the pass element, responsive to a second control signal, wherein the sense element is coupled to the pass element output;

responsive to a third control signal, providing, via a first buffer circuit, the first control signal, wherein the first buffer circuit includes a first buffer circuit transistor having a control terminal coupled to a control voltage terminal, a first current terminal coupled to the voltage supply terminal, and a second current terminal coupled to the pass element control terminal, a first current source, and a current mirror coupled in parallel with the first current source; and responsive to the third control signal, providing, via a second buffer circuit, the second control signal.

16. The method of claim 15, comprising:

comparing, via an error amplifier circuit, an output potential of the sense element with an output potential of the pass element.

17. The method of claim 16, comprising:

reducing, via a transistor, difference between the output potential of the sense element and the output potential of the pass element.

18. The method of claim 15, comprising:

adding, via a current mirror circuit, output current of the sense element into output current of the first buffer circuit, to adaptively adjust the first control signal.

19. The method of claim 15, comprising:

responsive to a voltage reference signal, converting potential variations at the output voltage terminal to feedback current.

* * * * *